No. 783,619.

Patented February 28, 1905.

UNITED STATES PATENT OFFICE.

HERBERT C. COWARD, OF OAKLAND, CALIFORNIA, ASSIGNOR TO CALIFORNIA SALT COMPANY, A CORPORATION OF CALIFORNIA.

APPARATUS FOR TREATING SALT.

SPECIFICATION forming part of Letters Patent No. 783,619, dated February 28, 1905.

Application filed April 4, 1904. Serial No. 201,524.

*To all whom it may concern:*

Be it known that I, HERBERT C. COWARD, a citizen of the United States, residing at Oakland, in the county of Alameda and State of California, have invented certain new and useful Improvements in Apparatus for Treating Salt, of which the following is a specification.

My invention relates to the manufacture of salt for commercial purposes; and my object is to provide an apparatus capable of producing one or more grades of refined, cleaned, and dried salt in granular or non-pulverulent form and free from all impurities, such as fine dust and mineral matter of low specific gravity. By my apparatus I am able to accomplish this result in a manner entirely mechanical and in that way to produce a product of better quality both on account of its granular form and by means of its freedom from impurities.

By increasing the size and extent of my apparatus I am able to produce several distinct grades of granular salt all having the qualities of purity and cleanliness and of resistance to moisture, which in salt as ordinarily manufactured tends to cake and harden it.

My application is illustrated in the accompanying drawings, which are designed to show one practical embodiment of my invention.

Figure 1:
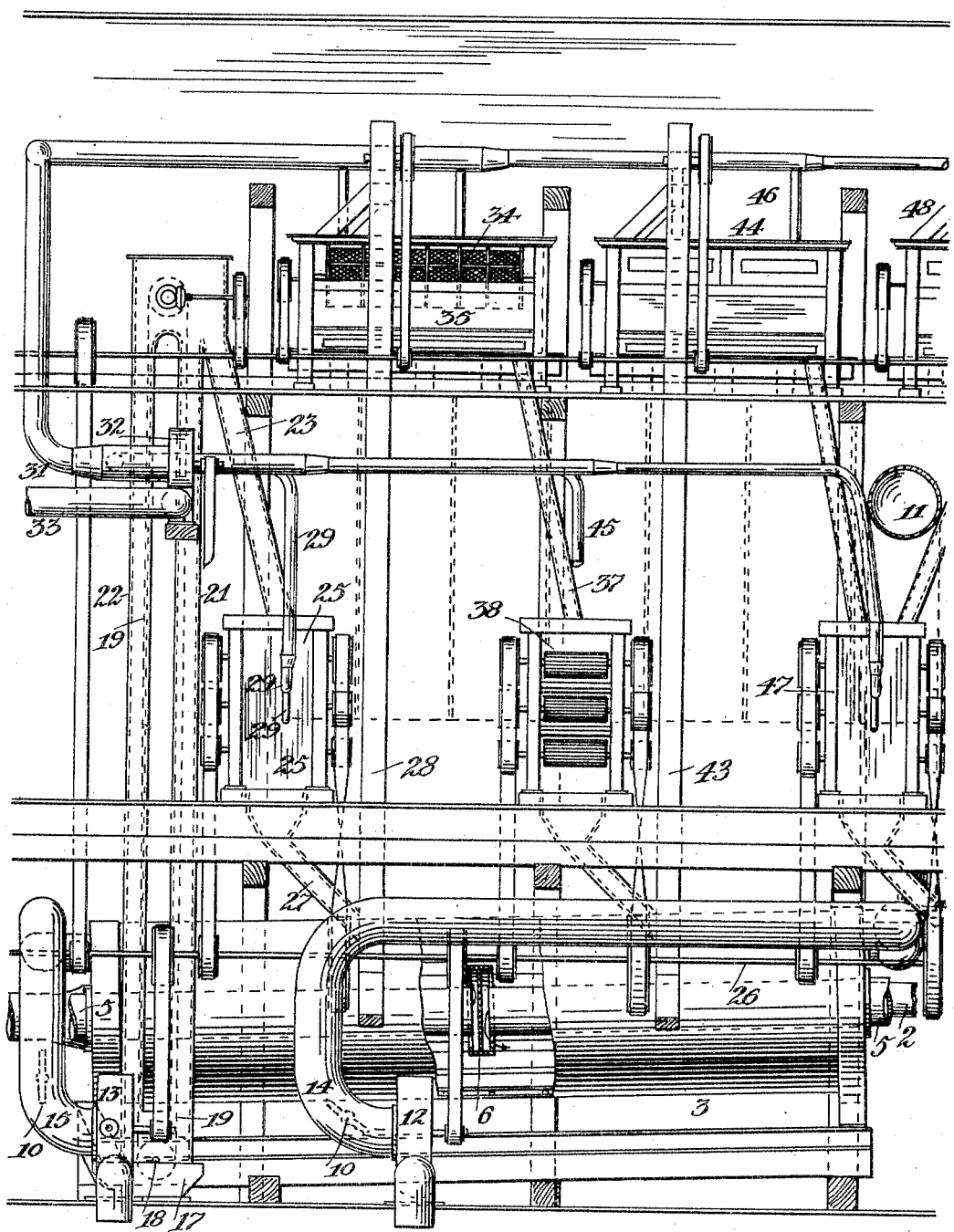
Figure 2:
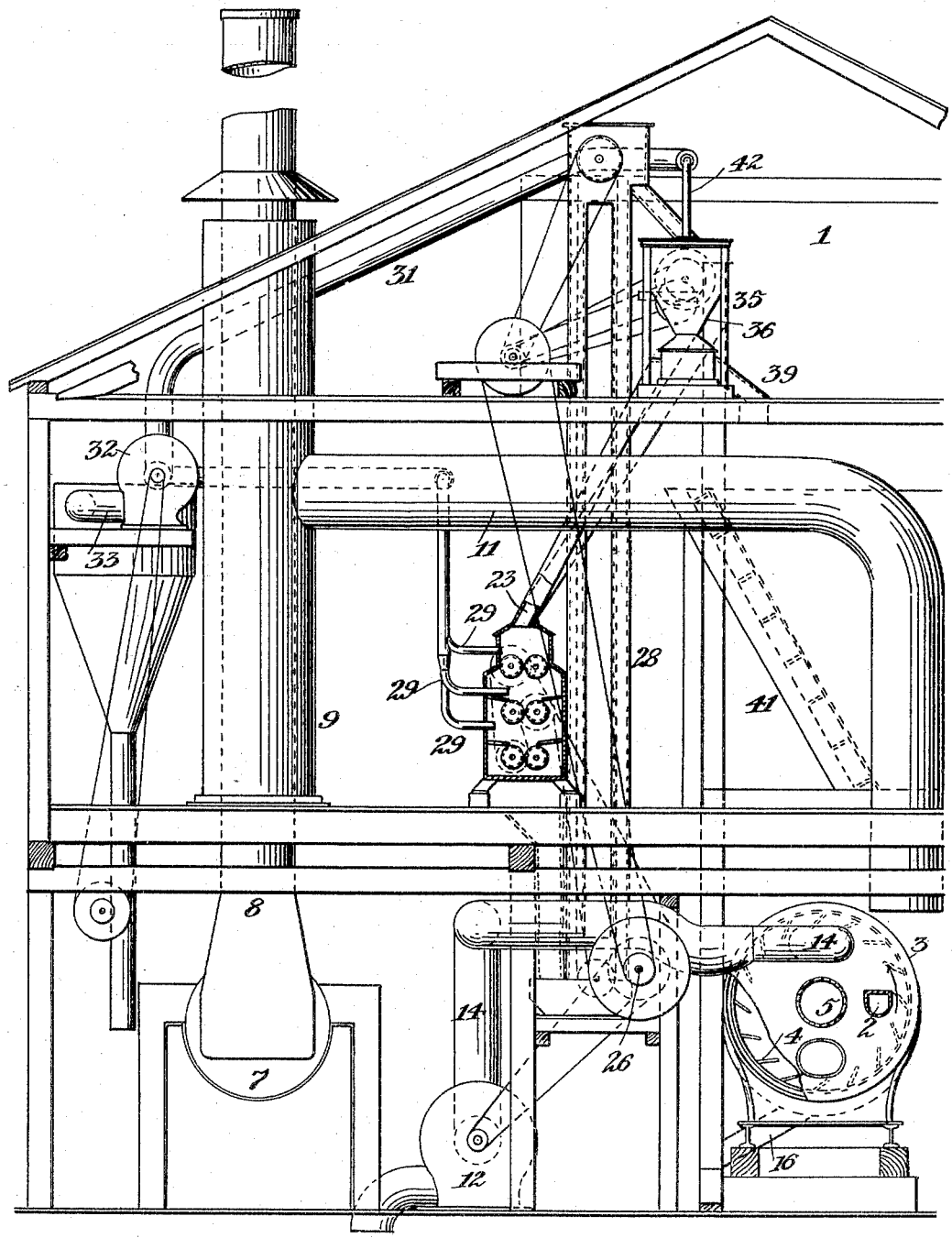

Figure 1 is a sectional elevation of the entire apparatus or plant. Fig. 2 is an end elevation.

The plant is inclosed in a suitable building or structure, (indicated at 1.)

The first step in the operation is the drying of the salt, which is supposed to have had a preliminary grinding and which as a moist ground mass is fed by any suitable means, such as a conveyer (not shown) in the trough 2, to the drier 3. The drier is a long hollow cylinder set in an inclined position and which is given a rotary motion in the direction of the arrow, Fig. 2, in any suitable manner. Within the cylinder and secured to its wall is a series of non-radial longitudinal shelves, ledges, or ribs 4. The non-radial setting of these shelves causes them to form longitudinal receptacles, into which the salt falls from the supply-trough. These receptacles are both carriers and agitators, lifting the salt at one side and discharging it at the top and other side, so that it is thoroughly turned over and agitated while being exposed to the drying-currents, at the same time being gradually conveyed through the inclined cylinder. The latter is rotated in any suitable and well-known manner.

A drying-current enters the drier from each end, the pipes for supplying such currents being shown at 5 5. These pipes approach each other within a drum 6, substantially at the middle of the drier, and such drum has openings for the escape of air. The common practice has been to admit the drying-current at one end only, and I have found the present method of leading two currents from opposite ends and freeing them at the middle to be much superior, because it produces a faster drying operation. By the old method the whole drying-current absorbed moisture from the wettest part of the mass; but in the present method only a portion of the combined currents acts upon the wettest part of the mass and the remainder upon the portions partly dried. Dividing the heat in the center keeps the dust at the dry end and out of contact with the wet salt, to which it readily adheres, and such adherence always takes place when the hot-air current enters at one end only. The air-conveying pipes 5 5 are supposed to lead from any suitable heating apparatus (not shown) exterior to the drier, and I utilize the products of combustion from the furnace 7 to partially heat the air in proximity to such heating apparatus, so that the heaters need not operate upon cold air. Thus the stack 8 has a surrounding jacket 9, from which a hot-air pipe 11 extends to and discharges near the heater.

As hot air is admitted to the drier at both ends, so is it drawn from both ends by the suction-blowers 12 13, whose inlet-pipes 14 15, provided with dampers 10, extend from opposite ends of the drier, as shown, and remove the moist air, dust, &c., in two separate currents.

The dried salt escapes from the lower end of the drier through a chute 16, which discharges it into a hopper 17. In this is the lower shaft 18 of an endless bucket elevator 19, running in the legs 21 22 and which raises the salt and then delivers it through a chute 23 to the first set of grinding-rollers. These rollers are arranged in pairs within a casing 25, and the roller-shafts of the several pairs project through the casing, respectively, in opposite directions and carry pulleys. As there are three separate sets of paired rollers shown, it may be stated here that the manner of driving them all is similar—that is, by belts from the shaft 26, to which power is applied in any suitable manner. The members of each pair of rollers revolve in opposite directions in the ordinary way of setting grinding-rollers. The rollers in casing 25 have a relatively coarse set of longitudinal ribs, teeth, or corrugations, so as to effect a grinding resulting in a granular product. This product as ground escapes from casing 25 and by chute 27 is led into the elevator-leg 28, by which it is raised to a screening apparatus. A purifying separation takes place in the casing 25, which forms an important feature. The salt is mixed with dust, some of which is dirt and impurities and the remainder material of comparatively low specific gravity, such as magnesia. Therefore pipes 29 lead from roller-casing 25 to the inlet-pipe 31 of a suction-blower 32, whose discharge-pipe 33 carries such material away.

The material elevated through the leg 28 is delivered to a rotary screen 34 within a double casing 35 36. Casing 35 incloses the whole screen mechanism and communicates by a chute 37 with a second series of grinding-rollers 38. The inner casing 36, which directly incloses the screen, discharges through a spout 39 into a bin 41 beneath. A pipe 42 leads from the outer casing to the inlet-pipe 31 of the suction-blower 32. Whatever material passes the meshes of screen 34 is delivered through spout 39 into the bin 41, which receives only that granulated product. The remainder escapes through the open end of the screen into the outer casing and goes through chute 37 to the second series of grinding-rollers. All the material within the screen and its casing is subjected to the cleaning and purifying action of the suction-blower 32, which removes the dust.

The grinding-rollers 38 operate and are driven like those previously described. They are more closely corrugated in order to make a finer grinding, and deliver the material to an elevator-leg 43, through which it is raised to the second screening apparatus 44. A pipe 45 connects the casing of the grinding-rollers 38 to the blower 32, and a pipe 46 connects the screening apparatus 44 to the same blower. The screening apparatus 44 produces another grade of fine pure salt, which is stored in a separate bin.

I have shown in the drawings a third grinding-roll casing 47 and a third screening apparatus 48, which in construction and operation are like those before described and produce a still more finely divided granular product.

The result of the operation performed by this machine is the production of salt thoroughly dried and cleaned and in granular condition in different grades without fine dust, magnesia, or other foreign substances, and as it is well known that a granular material will not absorb moisture readily like a pulverized material the salt is more satisfactory both for use and for storage, as it will not cake, harden, and deteriorate like most of the salt of commerce.

Having described my invention, what I claim as new, and desire to secure by Letters Patent, is—

1. In an apparatus for producing salt in granular form, the combination of a drier, sets of grinding-rolls, a screen in communication with each set of rolls, and a dust-removing device comprising a blower communicating with the rolls and the screens.

2. In an apparatus for producing salt in granular form, a drier, a set of grinding-rolls, a blower whose inlet-pipe enters the casing of said rolls, a screen, a casing inclosing the same, an elevator for conveying material from said grinding-rolls to said screen, a pipe leading from said screen-casing to a suction-blower and a discharge-spout from said screen to a final receptacle.

In testimony whereof I have affixed my signature, in presence of two witnesses, this 9th day of March, 1904.

HERBERT C. COWARD.

Witnesses:
L. W. SEELY,
M. R. SEELY.